United States Patent
Patil et al.

(10) Patent No.: US 10,988,676 B1
(45) Date of Patent: Apr. 27, 2021

(54) METHODS OF MAKING AND USING A HIGH TEMPERATURE WELLBORE SERVICING FLUID

(71) Applicant: Halliburton Energy Services, Inc., Houston, TX (US)

(72) Inventors: Sandip Prabhakar Patil, Pune (IN); Ganesh Shriniwas Pangu, Talegaon Dabhade (IN); Tamal Kumar Sen, Kolkata (IN); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/699,333

(22) Filed: Nov. 29, 2019

(51) Int. Cl.
*C09K 8/68* (2006.01)
*C09K 8/66* (2006.01)
(Continued)

(52) U.S. Cl.
CPC ............... *C09K 8/68* (2013.01); *C08K 3/346* (2013.01); *C08L 33/26* (2013.01); *C08L 41/00* (2013.01);
(Continued)

(58) Field of Classification Search
CPC . C09K 8/68; C09K 8/03; C09K 8/035; C09K 8/04; C09K 8/06; C09K 8/12;
(Continued)

(56) References Cited

U.S. PATENT DOCUMENTS 4,554,081 A * 11/1985 Borchardt ................ C09K 8/12
507/120
4,767,550 A * 8/1988 Hanlon ................... C08F 20/36
166/295
(Continued)

FOREIGN PATENT DOCUMENTS

| WO | 2013120636 A1 | 8/2013 |
| WO | 2016105331 A1 | 6/2016 |
| WO | 2016159975 A1 | 10/2016 |

OTHER PUBLICATIONS

API Publications Store, Designation: API RP 10B-2 2nd Ed (2013), American Petroleum Institute, retrieved Oct. 19, 2020 from https://www.apiwebstore.org/publications/item.cgi?26a875ea-7a2b-452b-9d6a-d32becc802a7 (Year: 2020).*

(Continued)

*Primary Examiner* — Angela M DiTrani Leff
(74) *Attorney, Agent, or Firm* — Conley Rose, P.C.; Rodney B. Carroll (57) ABSTRACT

A method of servicing a wellbore penetrating a subterranean formation, comprising: placing a wellbore servicing fluid (WSF) into the wellbore, wherein the WSF comprises a first polymer, a second polymer, and water, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the
(Continued)

second polymer is formed by polymerizing monomers and/or crosslinkers comprising AMPS, vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

21 Claims, 2 Drawing Sheets

(51) Int. Cl.
  *C09K 8/60* (2006.01)
  *C08L 41/00* (2006.01)
  *C08K 3/34* (2006.01)
  *C08L 33/26* (2006.01)
  *E21B 43/26* (2006.01)

(52) U.S. Cl.
  CPC .............. *C09K 8/601* (2013.01); *C09K 8/665* (2013.01); *E21B 43/26* (2013.01)

(58) Field of Classification Search
  CPC ... C09K 8/14; C09K 8/18; C09K 8/60; C09K 8/601; C09K 8/608; C09K 8/665; E21B 43/26; E21B 37/00; E21B 37/06; E21B 21/00; E21B 21/003; C08L 33/26; C08L 41/00; C08K 3/346
  USPC ...................................... 166/308.3
  See application file for complete search history.

(56) References Cited

U.S. PATENT DOCUMENTS

| | | | |
|---|---|---|---|
| 6,668,927 B1* | 12/2003 | Chatterji | C09K 8/40 166/291 |
| 7,270,183 B2 | 9/2007 | Bour et al. | |
| 9,938,447 B2 | 4/2018 | Michaux et al. | |
| 2004/0256157 A1* | 12/2004 | Tessari | E21B 43/10 175/57 |
| 2013/0324443 A1* | 12/2013 | Wang | C09K 8/487 507/121 |
| 2014/0342952 A1* | 11/2014 | Suryawanshi | C09K 8/40 507/226 |
| 2015/0315453 A1* | 11/2015 | Alexandre | E21B 7/00 175/72 |
| 2016/0024367 A1* | 1/2016 | Zha | E21B 7/00 166/308.2 |
| 2016/0272868 A1 | 9/2016 | Wang et al. | |
| 2016/0355722 A1* | 12/2016 | Galindo | E21B 43/26 |
| 2017/0306209 A1* | 10/2017 | Zha | C09K 8/887 |
| 2018/0010031 A1* | 1/2018 | Galindo | E21B 21/003 |
| 2018/0037795 A1* | 2/2018 | Goel | C09K 8/487 |
| 2018/0105737 A1 | 4/2018 | Prakash et al. | |
| 2018/0363413 A1 | 12/2018 | Gao et al. | |
| 2019/0062619 A1* | 2/2019 | Li | C09K 8/887 |
| 2019/0106616 A1* | 4/2019 | Hutchins | C09K 8/512 |

OTHER PUBLICATIONS

Hernandez, Rafael, Reverse-Circulation Cementing and High Performance Geothermal Cements, Halliburton, 2009, retrieved Oct. 19, 2020 from https://www.smu.edu/-/media/Site/Dedman/Academics/Programs/Geothermal-Lab/Conference/PastPresentations/2009/Hernandez_Halliburton_09.pdf?la=en (Year: 2009).*

Galindo, Kay A., et al., "High Temperature, High Performance Water-Based Drilling Fluid for Extreme High Temperature Wells," SPE International, 2015 SPE-173773-MS, pp. 1-9, Society of Petroleum Engineers.

Foreign Communication from Related Application—International Search Report and Written Opinion of the International Searching Authority, International Application No. PCT/US2019/063842, dated Aug. 26, 2020, 11 pages.

* cited by examiner

METHODS OF MAKING AND USING A HIGH TEMPERATURE WELLBORE SERVICING FLUID

BACKGROUND

This disclosure relates to methods of making and using a wellbore servicing fluid in a wellbore. More specifically, it relates to methods of making and introducing a wellbore servicing fluid into a wellbore penetrating a subterranean formation.

Natural resources such as gas, oil, and water residing in a subterranean formation or zone are usually recovered by drilling a wellbore down to the subterranean formation while circulating a drilling fluid in the wellbore. The drilling fluid is usually circulated downward through the interior of the drillpipe and upward through the annulus, which is located between the exterior of the drillpipe and the interior wall of the wellbore. Drilling may be halted and a string of casing is run into the wellbore, where residual drilling fluid may fill a volume provided by the interior of the casing string and/or an annular space provided between the exterior of the casing string and the interior wall of the wellbore. A spacer fluid is usually placed in the wellbore to physically separate the residual drilling fluid from a cementitious fluid being placed downhole after the spacer fluid. The cementitious fluid is placed into the wellbore downward through the interior of the casing string and upward through the annulus wherein the cement is allowed to set into a hard mass (i.e., sheath) to thereby attach the casing string to the walls of the wellbore and seal the annulus. The spacer fluid has to be compatible with the two fluids being separated, e.g., the drilling fluid and the cementitious fluid. In some wellbores the temperature can be very high (e.g., 450° F.), which may cause the spacer fluid to not be suitable for use because of the changes in properties, such as compatibility, yield point, and plastic viscosity.

Also, in various scenarios, fluid in a wellbore may communicate with fluid in the subterranean formation around the wellbore. It is well known that wellbores pass through a number of zones within a subterranean formation other than the particular hydrocarbon zones of interest. Some of these zones may have water influx, gas influx, or both from the subterranean formation surrounding a wellbore into the wellbore. In one scenario, undesired water production, gas production, or both can affect the economic life of hydrocarbon producing wells and can potentially induce other types of problems, such as sand production, scale, and corrosion of tubulars. In another scenario, fluids used in servicing a wellbore may be lost to the subterranean formation while circulating the fluids in the wellbore. In particular, the fluids may enter the subterranean formation via lost circulation zones, for example, depleted zones, zones of relatively low pressure, zones having naturally occurring fractures, weak zones having fracture gradients exceeded by the hydrostatic pressure of the wellbore servicing fluid (e.g., drilling fluid), and so forth. As a result, the service provided by such wellbore servicing fluid is more difficult to achieve. A wellbore servicing fluid with fluid loss control property is often introduced in the above scenarios to reduce and eventually prevent the undesired fluid communication between the wellbore and the subterranean formation surrounding the wellbore. At high temperatures, fluid control capability of the wellbore servicing fluid may decrease, making the wellbore servicing fluid less effective in preventing the undesired fluid communication.

Accordingly, an ongoing need exists for a wellbore servicing fluid that is suitable for use at high temperature as a spacer fluid or a fluid loss control fluid, thus can be used under broader conditions.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down". For example, in a horizontal wellbore, two locations may be at the same level (i.e., depth within a subterranean formation), the location closer to the well surface (by comparing the lengths along the wellbore from the wellbore surface to the locations) is referred to as "above" the other location.

A wellbore servicing fluid (WSF) is a fluid designed and prepared to resolve a specific wellbore or reservoir condition. This disclosure involves a WSF that can be used as a spacer fluid and/or a fluid loss control fluid (or referred to as a lost circulation fluid herein). The spacer fluid can physically separate one special-purpose fluid from another. The fluid loss control fluid can reduce or prevent undesired fluid communication between a wellbore and subterranean formation surrounding the wellbore. The methods disclosed herein involves making and using this WSF for servicing a wellbore penetrating a subterranean formation, more specifically, for using this WSF as a spacer fluid and/or a fluid loss control fluid.

A method of servicing a wellbore penetrating a subterranean formation comprises: placing a WSF into the wellbore, wherein the WSF comprises a first polymer, a second polymer, and water, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising AMPS, vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one. After substitution, the vinylpyrrolidinone can be referred to as a substituted vinylpyrrolidinone.

The WSF can comprise a first polymer. The first polymer can be formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline. The monomers may occur in any configuration in the first polymer and may be repeated with any frequency. The first polymer can comprise an AMPS-NNDMA-acrylamide terpolymer, wherein AMPS is 2-Acrylamido-2-methyl propane sulfonic acid and NNDMA is N,N-dimethylacrylamide, and wherein AMPS, NNDMA, and acrylamide may occur in any configuration in the first polymer and may be repeated with any frequency. The first polymer can be present in the WSF in an amount of from about 0.1 pound per barrel (lb/bbl) to about 6 lb/bbl based on the total volume of the WSF, alternatively from about 0.2 lb/bbl to about 5 lb/bbl, alternatively from about 0.5 lb/bbl to about 4 lb/bbl.

The WSF can comprise a second polymer. The second polymer can be formed by polymerizing monomers AMPS and vinylpyrrolidinone, and crosslinkers pentaerythritol allyl ether and methylenebisacrylamide, which are illustrated in Structure I below as monomers a and b, and crosslinkers c and d respectively. In embodiments, in the vinylpyrrolidinone in Structure I, the 2-Pyrrolidone group can be substituted by $R^3$ as shown in Structure II below to form a substituted vinylpyrrolidinone, wherein $R^3$ can be a heterocyclic group, comprising one or more Z membered rings with Y heteroatoms, wherein Z is equal to or greater than three, and wherein Y is equal to or greater than one. In other words, the second polymer can be formed by polymerizing monomers AMPS and the substituted vinylpyrrolidinone, and crosslinkers pentaerythritol allyl ether and methylenebisacrylamide, which are illustrated in Structure II below as monomers a and b, and crosslinkers c and d respectively.

Structure I

Structure II

The monomers and the crosslinkers may occur in any configuration in the second polymer and may be repeated with any frequency. In regards to monomer a, at each occurrence $R^1$ is independently selected from a group consisting of —H and a counterion. In regards to monomer b, $R^3$ can be independently selected from heterocyclic groups, comprising one or more Z membered rings with Y heteroatoms, wherein Z is equal to or greater than three, and wherein Y is equal to or greater than one. In regards to crosslinker c, at each occurrence, $R^2$ may be a tri-, di-, or monoallyl ether. If $R^2$ is not substituted with an allyl group, it exists as the alcohol. With reference to the $R^2$ and M functional groups of crosslinkers c and d respectively, functional groups $R^2$ and M may crosslink with other functional groups to link the polymer chain comprising crosslinkers c and d to another polymer chain. A "crosslink" refers herein to a bond linking one monomer or polymer chain to another polymer chain. The bond may be any bond, for example, covalent bond, ionic bond, and the like. A "crosslinker" is defined herein as comprising two or more olefinic bonds.

The AMPS can be present in the second polymer in an amount of from about 50 mol % to about 98 mol %, the vinylpyrrolidinone and/or the substituted vinylpyrrolidinone can be present in the second polymer in an amount of from about 1 mol % to about 40 mol %, the pentaerythritol allyl ether can be present in the second polymer an amount of about 0.1 mol % to about 5 mol %, and the methylenebisacrylamide can be present in the second polymer in an amount of about 0.1 mol % to about 15 mol %.

In embodiments, the second polymer can be a crosslinked polymer. The second polymer can be formed by polymerizing monomers and/or crosslinkers comprising AMPS, vinylpyrrolidinone, pentaerythritol allyl ether, and methylenebisacrylamide. The second polymer can be present in the WSF in an amount of from about 0.1 lb/bbl to about 6 lb/bbl based on the total volume of the WSF, alternatively from about 0.2 lb/bbl to about 5 lb/bbl, alternatively from about 0.5 lb/bbl to about 4 lb/bbl.

The WSF can comprise water. The water can comprise water selected from a group consisting of freshwater, seawater, saltwater, brine (e.g., natural brine, formulated brine, etc.), and combinations thereof. The formulated brine may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the WSF. The water can be present in the WSF in an amount effective to provide a slurry having desired (e.g., job or service specific) rheological properties such as density, viscosity, gel strength, yield point, etc. The water can be present in the WSF in an amount of from about 10 gallons per barrel (gal/bbl) to about 50 gal/bbl based on the total volume of the WSF, alternatively from about 15 gal/bbl to about 45 gal/bbl, alternatively from about 20 gal/bbl to about 40 gal/bbl.

The WSF can further comprise clay. The clay can comprise a natural clay, a synthetic clay, or combinations thereof. The clay can comprise bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof. In embodiments, the WSF can comprise sepiolite. The clay can be present in the WSF in an amount of from about 0.5 lb/bbl to about 8 lb/bbl based on the total volume of the WSF, alternatively from about 1 lb/bbl to about 7 lb/bbl, alternatively from about 1.5 lb/bbl to about 6 lb/bbl.

The WSF can further comprise a dispersant. The dispersant can comprise sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, and combinations thereof. An example of the dispersant suitable for use in this disclosure include without limitation includes CFR-3™ cement friction reducer, which is commercially available from Halliburton Energy Services, Inc.

The dispersant can be present in the WSF in an amount of from about 0.5 lb/bbl to about 8 lb/bbl based on the total volume of the WSF, alternatively from about 1 lb/bbl to about 7 lb/bbl, alternatively from about 1.5 lb/bbl to about 6 lb/bbl.

The WSF can further comprise a weighting agent. The weighting agent can comprise barium sulfate (e.g., barite), iron oxide (e.g., hematite), manganese oxide (e.g., hausmannite), sand (e.g., silica sand), ilmenite, manganese tetraoxide, zinc oxide, zirconium oxide, fly ash, calcium carbonate, siderite, or combinations thereof. Barite is a nonmetallic mineral of barium sulfate ($BaSO_4$) with a specific gravity range of from about 4.3 to about 5. Examples of barites suitable for use in this disclosure include without limitation BAROID® 41 weighting material and SWEEP-WATE® Coarse Grind Barite weighting material, which are commercially available from Halliburton Energy Services, Inc. The weighting agent can be present in the WSF in an amount of from about 0 lb/bbl to about 800 lb/bbl based on the total volume of the WSF, alternatively from about 0 lb/bbl to about 750 lb/bbl, alternatively from about 0 lb/bbl to about 700 lb/bbl.

The WSF can further comprise a lost circulation material (LCM) and be referred to as a lost circulation fluid or a fluid loss control fluid. The LCM can comprise graphite, sand (e.g., 100 mesh), silica flour, mineral particles, thermoset polymer laminate particles, graphitic carbon-based particles, ground battery casings, ground tires, ground nut shells (e.g., walnut shells, peanut shells, and almond shells), sized-calcium carbonate particles, petroleum coke particles, vitrified shale particles, calcium clay particles, glass particles, mica particles, ceramic particles, polymeric beads, synthetic fibers (e.g., polypropylene fibers), glass fibers, mineral fibers (e.g., basalt, wollastonite, and sepiolite), and combinations thereof. The LCM can be particles having the physical shape of platelets, shavings, fibers, flakes, ribbons, rods, strips, spheroids, toroids, pellets, tablets, or any other physical shape.

The LCM may be included in the WSF to improve its mechanical properties such as tensile strength, compressive strength, resilience, rigidity, flexibility, and the like. The LCM can have a multimodal particulate material distribution. The LCM having a multimodal particle size distribution may have a bimodal particle size distribution, trimodal particle size distribution, or other suitable particle size distribution as desired, inter alia, on the particular application. Commercial examples of suitable sized-calcium carbonate particles include but are not limited to BARACARB® 5 sized-calcium carbonate, BARACARB® 25 sized-calcium carbonate, BARACARB® 50 sized-calcium carbonate, and BARACARB® 150 sized-calcium carbonate, which are commercially available from Halliburton Energy Services, Inc. The LCM can be present in the WSF in an amount of from about 1 lb/bbl to about 80 lb/bbl based on the total volume of the WSF, alternatively from about 2 lb/bbl to about 70 lb/bbl, alternatively from about 3 lb/bbl to about 50 lb/bbl.

The WSF can further comprise one or more additives. The one or more additives can comprise an emulsifier, a defoamer, an expansion agent, a salt, a fluid loss agent, a vitrified shale, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, or combinations thereof. The one or more additives can be present in the WSF in an amount of from about 0.01 gal/bbl to about 5 gal/bbl based on the total volume of the WSF, alternatively from about 0.1 gal/bbl to about 4 gal/bbl, alternatively from about 0.1 gal/bbl to about 3 gal/bbl.

The WSF can be used at temperature in a range of from room temperature to about 450° F. The WSF can have a density of from about 8.5 lb/gal to about 20 lb/gal.

Plastic viscosity is the viscosity when extrapolated to infinite shear rate, e.g., the slope of the shear stress/shear rate line above yield point. The yield point refers to the resistance of a fluid to initial flow, or represents the stress required to start fluid movement. The WSF can have any suitable plastic viscosity and yield point. At 80° F. to 375° F. and 3000 psi the WSF can have a plastic viscosity of from about 300 cP to about 20 cP. At 80° F. to 375° F. and 3000 psi the WSF can have a yield point of from about 30 lbf/100 $ft^2$ to about 5 lbf/100 $ft^2$.

The WSF can have a decrease or an increase in rheology reading during a compatibility test with a cement slurry at 30 rpm and 300 rpm when measured in accordance with test standard API-RP-10B-2, wherein the increase can be of equal to or less than about 30%, alternatively of equal to or greater than about 10% and equal to or less than about 30%, alternatively of equal to or greater than about 20% and equal to or less than about 30%. The WSF can have a decrease or an increase in rheology reading during a compatibility test with a mud at 30 rpm and 300 rpm when measured in accordance with test standard API-RP-10B-2, wherein the increase can be of equal to or less than about 30%, alternatively of equal to or greater than about 10% and equal to or less than about 30%, alternatively of equal to or greater than about 20% and equal to or less than about 30%. Supporting data and details are in the Examples 2 and 3.

The WSF can have any suitable fluid loss control properties. For example, an actual fluid loss of from about 50 ml per 30 minutes to about 100 ml per 30 minutes on 60 mesh screen at 325° F., 25.3 lb/gal loading, when measured in accordance with test standard API-RP-10B-2. The actual fluid loss refers to fluid loss in milliliter (ml) that is actually collected in the measurement. In embodiments, the WSF can have an actual fluid loss of from about 50 ml per 30 minutes to about 100 ml per 30 minutes on 60 mesh screen at 375° F., 31.6 lb/gal loading, when measured in accordance with test standard API-RP-10B-2. These properties make the WSF possible to be used to minimize the fluid loss in operation.

Disclosed herein is a method of preparing a WSF, comprising: placing a mixture comprising a first polymer, a second polymer, and water into a container, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one; and blending the mixture until the mixture becomes a homogeneous fluid. The container can be any container that is compatible with the mixture and has sufficient space for the mixture. A blender can be used for blending. The WSF can be prepared at the wellsite. For example the solid components (e.g., the polymers) of the WSF can be transported to the wellsite and combined (e.g., mixed/blended) with water located proximate the wellsite to form the WSF. The solid composition of the WSF can be prepared at a location remote from the wellsite and transported to the wellsite, and, if necessary, stored at the on-site location. When it is desirable to prepare the WSF on the wellsite, the solid composition of the WSF along with additional water and optional other additives can be added into a container (e.g. a blender tub, for example mounted on a trailer), and the mixture is then blended until the mixture becomes a pumpable fluid. Additives can be added to the WSF during preparation thereof (e.g., during blending) and/or on-the-fly by addition to (e.g., injection into) the WSF when being pumped into the wellbore.

The WSF can be used as a spacer fluid to physically separate two or more fluids present in a wellbore, and the WSF can be referred to as a spacer fluid. For example, the spacer fluid can be placed in to the wellbore to separate a drilling fluid from a cementitious fluid. When placing the spacer fluid into the wellbore, there can be a conduit inside the wellbore, and the method of servicing a wellbore penetrating a subterranean formation further comprises: circulating the spacer fluid down through the conduit and back up through an annular space between an outside wall of the conduit and a wall of the wellbore, or circulating the spacer fluid down through an annular space between an outside wall of the conduit and a wall of the wellbore and back up through the conduit. The conduit can be casing. The spacer fluid can be placed between two fluids (the first fluid and the second fluid) contained or to be pumped within a wellbore. The spacer fluid can physically space the first fluid apart from the second fluid such that the first fluid and the second fluid do not comingle while being placed (e.g., pumped) into the wellbore. In embodiments, the spacer fluid can be used to space apart two fluids (e.g., drilling fluid/mud and a cementitious fluid) that are being flowed from the surface down through a conduit (e.g., casing) present in the wellbore, exiting the conduit and flowing back upward in the annular space between the outside conduit wall and interior face of the wellbore. In embodiments, the spacer fluid can be used to space apart two fluids (e.g., drilling fluid/mud and a cementitious fluid) that are being flowed from the surface down through the annular space between the outside conduit wall and interior face of the wellbore, exiting the annular space and flowing back upward through the inside of the conduit.

Disclosed herein is a method of servicing a wellbore with casing disposed therein to form annular space between the wellbore wall and an outer surface of the casing, wherein a first fluid is present in at least a portion of the annular space, comprising: placing a spacer fluid into at least a portion of the annular space and displacing at least a portion of the first fluid from the annular space, wherein the spacer fluid comprises a first polymer, a second polymer and water, and wherein: the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one; and placing a cementitious fluid into at least a portion of the annular space and displacing at least a portion of the spacer fluid from the annular space. The first fluid can be a drilling fluid. The drilling fluid herein refers to any liquid and gaseous fluid and mixtures of fluids and solids used in operations of drilling a borehole into the earth. The drilling fluid can be water based, non-water based, and/or gaseous. The method as disclosed herein can further comprise allowing at least a portion of the cementitious fluid to set. A cementitious fluid refers to the material used to permanently seal the annular space between the casing and the wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is less viscous and has less strength than cementitious or concrete used for construction, since the cementitious fluid is required to be pumpable in relatively narrow annulus over long distances. A cementitious fluid is typically prepared by mixing cement, water, and assorted dry and liquid additives.

Figure 1A:
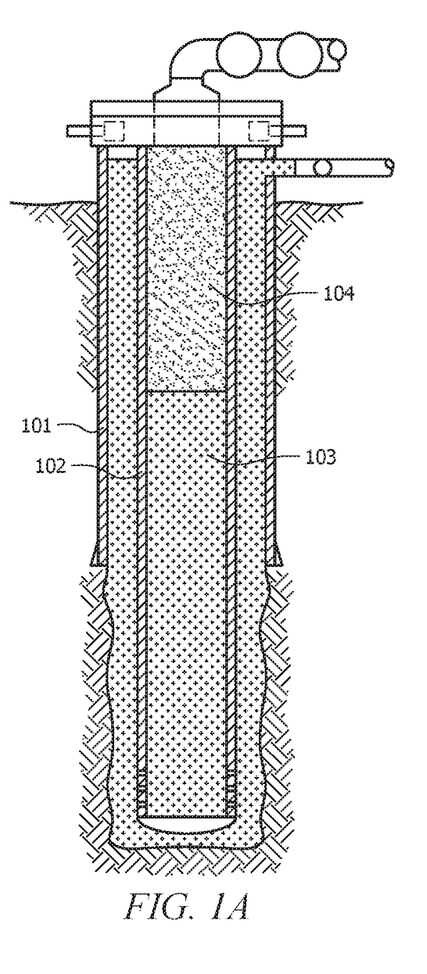
FIGS. 1A and 1B are cross-sectional, side views of a wellbore penetrating a subterranean formation, with a conduit disposed therein.
Figure 1B:
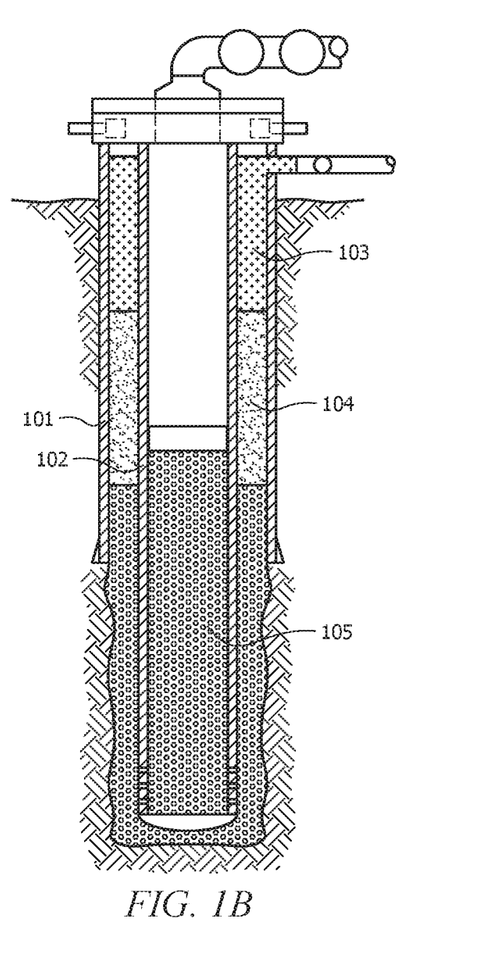

Disclosed herein is a method of servicing a wellbore 101 penetrating a subterranean formation as shown in FIGS. 1A and 1B, wherein the wellbore 101 has a conduit 102 disposed therein forming an annular space between an outer wall of the conduit 102 and an inner wall of the wellbore 101, comprising: pumping a first fluid 103 followed by a spacer fluid 104 followed by a second fluid 105 from the surface down an inner flow bore of the conduit 102, out an end of the conduit 102, and back up the annular space toward the surface, wherein the spacer fluid 104 comprises a first polymer, a second polymer and water, and wherein: the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one. The conduit 102 can comprise casing, the first fluid 103 can be a drilling fluid, and the second fluid 105 can be a cementitious fluid.

Figure 2A:
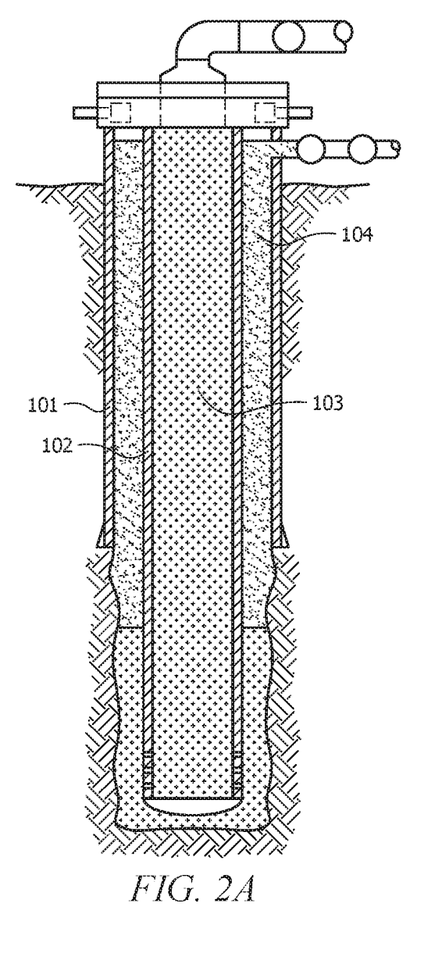
FIGS. 2A and 2B are cross-sectional, side views of a wellbore penetrating a subterranean formation, with a conduit disposed therein.
Figure 2B:
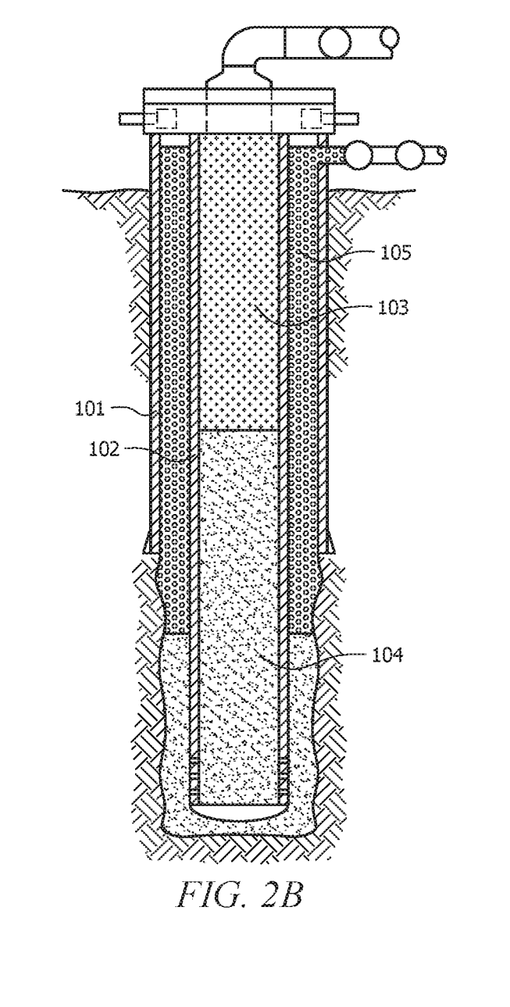

In embodiments, the direction of the flow of the first fluid, the spacer fluid, and the second fluid can reverse from that in the method disclosed above. Disclosed herein is a method of servicing a wellbore 101 penetrating a subterranean formation as shown in FIGS. 2A and 2B, wherein the wellbore 101 has a conduit 102 disposed therein forming an inner flow bore of the conduit 102 and an annular space between an outer wall of the conduit 102 and an inner wall of the wellbore 101, comprising: pumping a first fluid 103 followed by a spacer fluid 104 followed by a second fluid 105 from the surface down through the annular space, out an end of the annular space, and back up the inner flow bore toward the surface, wherein the spacer fluid 104 comprises a first polymer, a second polymer and water, and wherein: the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one. The conduit 102 can comprise casing, the first fluid 103 can be a drilling fluid, and the second fluid 105 can be a cementitious fluid.

The WSF can be used as a lost circulation fluid or a fluid loss control fluid, for example by adding a lost circulation material (LCM). In embodiments, the wellbore can comprise a permeable zone, and the WSF can contact the permeable zone and reduce an inflow of fluid from the formation into the wellbore or reduce an outflow of fluid from the wellbore into the formation.

The permeable zone can comprise a flow path from the subterranean formation into the wellbore for the influx of water, gas, or both from the subterranean formation into the wellbore. This may be caused by the high pressure of fluid in the formation around the portion of the wellbore resulting in an undesired water/gas influx. Also, over the life of wells with multiple perforated and fractured zones, one or more of the multiple perforated and fractured zones may develop an undesired influx of water, gas, or both. Additionally, the one or more flow paths providing for an undesired water/gas influx can be formed as a result of loss of structural integrity of the casing (e.g., casing corrosion). It can be desired to treat the zone to restrict water/gas inflow. The fluid loss control fluid can flow into at least a portion of the flow path and at least partially block the flow path, thus reduce or prevent the inflow of the water, gas, or both.

In embodiments, the permeable zone can comprise a lost circulation zone, for example, a depleted zone, a zone of relatively low pressure, a zone having naturally occurring fractures, a weak zone having fracture gradients exceeded by the hydrostatic pressure of the drilling fluid, and so forth. As a result, service provided by a wellbore servicing fluid in the zone is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation. The fluid loss control fluid can flow into at least a portion of the zone and reduce in outflow of fluid from the wellbore into the formation.

Disclosed herein is a method of treating a subterranean formation penetrated by a wellbore, comprising: drilling the wellbore with a drill bit connected to drill pipe; determining a location of a lost circulation zone in an uncased portion of the wellbore; discontinuing drilling; introducing, via the drill pipe, a lost circulation fluid at proximate the location of the lost circulation zone, wherein the lost circulation fluid comprises a first polymer, a second polymer, a lost circulation material, and water, wherein: the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one; allowing the lost circulation fluid to flow into at least a portion of the lost circulation zone; allowing the lost circulation fluid to block at least a portion of the lost circulation zone; and resuming drilling of the wellbore.

The methods as disclosed herein have various advantages to many operations. The WSF has good yield point to avoid the settling of weighting agent even at high temperature. The WSF also has good compatibility with cementitious fluid and mud at a temperature up to 450° F. By incorporating the LCM, the WSF can have good fluid loss control properties up to 450° F., thus can be used to reduce and/or prevent fluid communication between a wellbore and formation around the wellbore. Because these good properties of the WSF can be up to a high temperature (e.g., 450° F.), the WSF can help in achieving the dependable barrier in a wellbore, thus can be used in broader applications (e.g., under complex environment with high temperature and high pressure in a wellbore). The WSF can also help to mitigate the risk of fluid loss thus improve the top pf cement (TOC) even at a high temperature.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner. In particular, reference is made in the examples to "spacer fluid" compositions, and it should be understood that such spacer fluid compositions may be used for other wellbore servicing purposes, for example without limitation, such as a fluid loss control fluid or a lost circulation fluid.

Three different spacer formulation to make a spacer fluid of density 13.4 lb/gal are given in Table 1. The spacer fluids in Table 1 are used in the Examples 1-3.

TABLE 1

| Different Formulations | | | |
|---|---|---|---|
| | Spacer 1 | Spacer 2 | Spacer 3 |
| The first polymer (lb/bbl) | 1.25 | 2.5 | — |
| The second polymer (lb/bbl) | 1.25 | — | 2.5 |
| Sepiolite (lb/bbl) | 3 | 3 | 3 |
| Dispersant (lb/bbl) | 3 | 3 | 3 |
| LCM, sized-ground marble (lb/bbl) | 10.6 | 10.6 | 10.6 |
| Walnut (lb/bbl) | 4 | 4 | 4 |
| Graphite (lb/bbl) | 2.4 | 2.4 | 2.4 |
| Barite (lb/bbl) | 262 | 262 | 262 |
| Emulsifier (gal/bbl) | 0.6 | 0.6 | 0.6 |
| Surfactant (gal/bbl) | 0.6 | 0.6 | 0.6 |
| Defoamer (gal/bbl) | 0.3 | 0.3 | 0.3 |
| Water (gal/bbl) | 30.95 | 30.95 | 30.95 |

Example 1

The spacer fluids in Table 1 were tested for high temperature high pressure rheology on an iX77™ rheometer by FANN Instrument Company. A separate test was carried out for each of Spacers 1, 2 and 3. The rheology was measured at 80° F., 180° F., 300° F., 325° F., 350° F., and 375° F., and a pressure of 3000 psi. The Plastic viscosity and Yield point is calculated using Bingham Plastic model. The rheology readings are given in Table 2.

TABLE 2

| | high temperature rheology readings | | | | | | | | | | | | | | | | | |
|---|---|---|---|---|---|---|---|---|---|---|---|---|---|---|---|---|---|---|
| | Spacer 1 (° F.) | | | | | | Spacer 2 (° F.) | | | | | | Spacer 3 (° F.) | | | | | |
| RPM | 80 | 180 | 300 | 325 | 350 | 375 | 80 | 180 | 300 | 325 | 350 | 375 | 80 | 180 | 300 | 325 | 350 | 375 |
| 3 | 10 | 10 | 9 | 9 | 9 | 7 | 9 | 3 | 1 | 1 | 1 | 1 | 7 | 8 | 9 | 8 | 9 | 9 |
| 6 | 15 | 13 | 10 | 11 | 11 | 8 | 13 | 8 | 2 | 2 | 2 | 1 | 8 | 10 | 10 | 9 | 10 | 9 |
| 30 | 33 | 25 | 17 | 17 | 17 | 12 | 28 | 16 | 9 | 7 | 6 | 4 | 15 | 15 | 19 | 17 | 15 | 15 |
| 60 | 45 | 34 | 23 | 22 | 22 | 16 | 37 | 23 | 15 | 13 | 12 | 7 | 20 | 18 | 21 | 21 | 20 | 19 |
| 100 | 56 | 41 | 29 | 28 | 27 | 21 | 44 | 30 | 22 | 19 | 19 | 12 | 27 | 23 | 23 | 24 | 23 | 23 |
| 200 | 75 | 51 | 40 | 38 | 37 | 31 | 59 | 42 | 32 | 31 | 30 | 21 | 41 | 30 | 28 | 30 | 29 | 30 |
| 300 | 90 | 62 | 49 | 48 | 46 | 40 | 76 | 51 | 39 | 38 | 37 | 28 | 54 | 39 | 34 | 34 | 34 | 34 |
| PV (cP) | 76 | 48 | 40 | 38 | 35 | 33 | 62 | 45 | 38 | 38 | 38 | 28 | 47 | 29 | 23 | 24 | 25 | 25 |
| YP (lbf/100 ft2) | 22 | 19 | 13 | 13 | 13 | 9 | 18 | 10 | 5 | 3 | 3 | 1 | 10 | 11 | 14 | 13 | 12 | 12 |

From Table 2 it is evident that, the spacer fluid having a combination of the first polymer and the second polymer (spacer 1) shows higher rheology reading when compared with the spacer fluids having an individual component of the two polymers (spacers 2 and 3) up to 350° F. and also shows better plastic viscosity and yield point retention at high temperature than spacer 2.

Example 2

The spacer fluids in Table 1 were tested for compatibility with a cement slurry in accordance with test standard API-RP-10B-2. The compatibility of these spacer fluids with the cement slurry are given in Tables 3, 4 and 5. The cement slurry has a composition of 60 wt. % of Class G cement and 40 wt. % of water. In the test, the spacer fluids and the cement slurry were conditioned separately at 325° F. and 5500 psi for 30 min in a high pressure high temperature (HPHT) consistometer. Then the spacer fluids and the cement slurry were cooled down and the compatibility testing was performed at 180° F. In Tables 3-5, the percentage of spacer or cement is volume percentage, for example, 95% Spacer means a mixture of 95 vol. % Spacer and 5 vol. % cement slurry. Spacer 1 shows better compatibility at high rpm reading when compared with Spacer 2. Spacer 1 also shows better compatibility than Spacer 3 mainly at lower rpm readings. With the first and the second polymers, Spacer 1 has better compatibility with the cement slurry than Spacers 2 and 3, without hampering the rheology at high temperature. Here, the readings are increasing mostly at lower rpm and that increase (wherever there is increase) is up to 25%, compared to 100 vol. % cement. 100 vol. % cement readings are higher than 100 vol. % spacer and thus are used as reference to calculate the percentage of increase.

TABLE 3

Compatibility between Spacer 1 and Cement slurry at 180° F.

| rpm | 100% Spacer | 95% Spacer | 75% Spacer | 50% Spacer | 25% Spacer | 5% Spacer | 100% Cement |
|---|---|---|---|---|---|---|---|
| 3 | 10 | 15.5 | 10.5 | 9 | 5.5 | 5 | 4.5 |
| 6 | 13.5 | 19 | 14.5 | 14 | 8 | 8 | 8.5 |
| 30 | 28.5 | 36 | 30 | 31 | 24 | 26.5 | 29 |
| 60 | 39.5 | 50 | 44 | 47 | 39 | 44.5 | 48 |
| 100 | 51 | 63 | 59 | 66 | 58 | 64 | 70 |
| 200 | 69 | 88 | 91 | 109 | 106 | 111 | 119.5 |
| 300 | 80 | 104 | 115 | 148 | 150 | 155 | 162 |

TABLE 4

Compatibility between Spacer 2 and Cement slurry at 180° F.

| rpm | 100% Spacer | 95% Spacer | 75% Spacer | 50% Spacer | 25% Spacer | 5% Spacer | 100% Cement |
|---|---|---|---|---|---|---|---|
| 3 | 4 | 5 | 6 | 6 | 5.5 | 5 | 6 |
| 6 | 8 | 10 | 9 | 9 | 8 | 8.5 | 9 |
| 30 | 22.5 | 24.5 | 27 | 26 | 23 | 28 | 31 |
| 60 | 32 | 37 | 41 | 42 | 40 | 49 | 52 |
| 100 | 40 | 47 | 52 | 61 | 63 | 75 | 74 |
| 200 | 54.5 | 63 | 74 | 104 | 118 | 141 | 121 |
| 300 | 64 | 79 | 95 | 140 | 168 | 205 | 165 |

TABLE 5

Compatibility between Spacer 3 and Cement slurry at 180° F.

| rpm | 100% Spacer | 95% Spacer | 75% Spacer | 50% Spacer | 25% Spacer | 5% Spacer | 100% Cement |
|---|---|---|---|---|---|---|---|
| 3 | 9.5 | 12 | 18 | 14 | 7 | 5 | 4 |
| 6 | 11.5 | 15 | 24 | 18 | 11 | 9 | 7 |
| 30 | 19 | 29.5 | 46 | 41 | 31 | 30 | 26 |
| 60 | 25 | 35 | 60 | 59 | 49 | 49 | 45 |
| 100 | 30 | 41 | 75 | 78 | 69 | 71 | 68 |
| 200 | 40.5 | 52 | 101 | 116 | 110 | 119 | 115 |
| 300 | 47 | 68 | 122 | 148 | 146 | 159 | 156 |

Example 3

The spacer fluids in Table 1 were tested for compatibility with a mud in accordance with test standard API-RP-13B-2. The mud is synthetic oil based mud (SOBM). The compatibility of these spacer fluids with the mud are given in Tables 6, 7 and 8. In the test, the spacer fluids and the mud were conditioned separately at 325° F. and 5500 psi for 30 min in a high pressure high temperature (HPHT) consistometer. Then the spacer fluids and the mud were cooled down and the compatibility testing was performed at 180° F. In Tables 6-8, the percentage of spacer or mud is volume percentage, for example, 95% Spacer means a mixture of 95 vol. % Spacer and 5 vol. % mud. From Table 6, 7 and 8, it is evident that the spacer having both of the polymers (Spacer 1) has better compatibility with mud when compared with the spacers with an individual polymer (Spacers 2 and 3). Here the readings are increasing mostly at higher rpm and that increase (wherever there is increase) is up to 25%, compared to 100 vol. % spacer. 100 vol. % spacer readings are higher than 100 vol. % mud and thus are used as a reference to calculate the percentage of increase.

TABLE 6

Compatibility between Spacer 1 and mud at 180° F.

| rpm | 100% Spacer | 95% Spacer | 75% Spacer | 50% Spacer | 25% Spacer | 5% Spacer | 100% Mud |
|---|---|---|---|---|---|---|---|
| 3 | 11 | 12 | 13.5 | 7.5 | 7.5 | 5 | 4 |
| 6 | 14.5 | 16 | 17 | 8.5 | 9.5 | 6 | 4.5 |
| 30 | 29.5 | 31 | 28.5 | 16.5 | 21 | 13.5 | 10 |
| 60 | 40.5 | 43 | 38 | 24 | 31 | 21.5 | 15.5 |
| 100 | 51.5 | 54.5 | 48 | 32 | 43 | 32.5 | 22.5 |
| 200 | 66 | 73 | 66.5 | 49.5 | 68 | 56.5 | 39 |
| 300 | 76 | 84 | 79 | 63 | 91 | 79 | 54 |

TABLE 7

Compatibility between Spacer 2 and mud at 180° F.

| rpm | 100% Spacer | 95% Spacer | 75% Spacer | 50% Spacer | 25% Spacer | 5% Spacer | 100% Mud |
|---|---|---|---|---|---|---|---|
| 3 | 5.5 | 6.5 | 8 | 4 | 10.5 | 4 | 4 |
| 6 | 9 | 10 | 10 | 5.5 | 13.5 | 5 | 5 |
| 30 | 24 | 27.5 | 21.5 | 12.5 | 25 | 11.5 | 9 |
| 60 | 33.5 | 39 | 31.5 | 18.5 | 36 | 18.5 | 16 |
| 100 | 42 | 48.5 | 41 | 26 | 48.5 | 27.5 | 22 |
| 200 | 57 | 64 | 57.5 | 42.5 | 79.5 | 47 | 41 |
| 300 | 68 | 75 | 71 | 57 | 122 | 67 | 57 |

TABLE 8

Compatibility between Spacer 3 and mud at 180° F.

| rpm | 100% Spacer | 95% Spacer | 75% Spacer | 50% Spacer | 25% Spacer | 5% Spacer | 100% Mud |
|---|---|---|---|---|---|---|---|
| 3 | 10 | 19 | 18 | 8 | 9 | 4 | 3 |
| 6 | 14 | 21 | 20 | 10 | 11.5 | 5 | 4 |
| 30 | 24 | 32 | 29 | 18 | 24 | 12 | 9 |
| 60 | 32.5 | 40 | 36 | 25 | 34.5 | 19 | 14 |
| 100 | 40 | 48.5 | 43 | 33 | 47 | 27.5 | 23 |
| 200 | 52 | 64.5 | 56.5 | 49.5 | 74 | 47.5 | 40 |
| 300 | 63 | 78 | 68 | 65 | 98 | 66 | 53 |

Example 4

A spacer fluid with a solid composition of: 5 wt. % of the first polymer, 5 wt. % of the second polymer, 12 wt. % dispersant, 12 wt. % Sepiolite, 41 wt. % lost circulation materials, 9 wt. % Graphite, 16 wt. % walnut, and with water to have a 13.4 lb/gal density, is measured for fluid loss on 60 mesh screen according to the procedures in API-RP-10B-2. Table 9 shows the fluid loss in actual milliliter (ml) collected in the experiment. The results indicate that the spacer fluid has good control on 60 mesh screens hence can be used to minimize the losses while cementing.

TABLE 9

Fluid loss on 60 mesh screen

| Blend Loading (lb/gal) | Temperature (° F.) | Fluid loss in 30 min (ml) |
|---|---|---|
| 25.3 | 325 | 82 |
| 31.6 | 375 | 87 |

ADDITIONAL DISCLOSURE

The following are non-limiting, specific embodiments in accordance with the present disclosure:

A first embodiment, which is a method of servicing a wellbore penetrating a subterranean formation, comprising: placing a wellbore servicing fluid (WSF) into the wellbore, wherein the WSF comprises a first polymer, a second polymer, and water, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising AMPS, vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

A second embodiment, which is the method of the first embodiment, wherein the first polymer comprises an AMPS-NNDMA-acrylamide terpolymer, wherein AMPS is 2-Acrylamido-2-methyl propane sulfonic acid and NNDMA is N,N-dimethylacrylamide.

A third embodiment, which is the method of the first or the second embodiment, wherein the first polymer is present in the WSF in an amount of from about 0.1 pound per barrel (lb/bbl) to about 6 lb/bbl based on the total volume of the WSF, alternatively from about 0.2 lb/bbl to about 5 lb/bbl, alternatively from about 0.5 lb/bbl to about 4 lb/bbl.

A fourth embodiment, which is the method of any of the first through the third embodiments, wherein the AMPS is present in the second polymer in an amount of from about 50 mol % to about 98 mol %, wherein the vinylpyrrolidinone and/or the substituted vinylpyrrolidinone is present in the second polymer in an amount of from about 1 mol % to about 40 mol %, wherein the pentaerythritol allyl ether is present in the second polymer an amount of about 0.1 mol % to about 5 mol %, and wherein the methylenebisacrylamide is present in the second polymer in an amount of about 0.1 mol % to about 15 mol %.

A fifth embodiment, which is the method of any of the first through the fourth embodiments, wherein the second polymer is a crosslinked polymer.

A sixth embodiment, which is the method of any of the first through the fifth embodiments, wherein the second polymer is formed by polymerizing monomers and/or crosslinkers comprising AMPS, vinylpyrrolidinone, pentaerythritol allyl ether, and methylenebisacrylamide.

A seventh embodiment, which is the method of any of the first through the sixth embodiments, wherein the second polymer is present in the WSF in an amount of from about 0.1 lb/bbl to about 6 lb/bbl based on the total volume of the WSF, alternatively from about 0.2 lb/bbl to about 5lb/bbl, alternatively from about 0.5 lb/bbl to about 4 lb/bbl.

An eighth embodiment, which is the method of any of the first through the seventh embodiments, wherein the water comprises water selected from the group consisting of freshwater, saltwater, brine, seawater, and any combination thereof.

A ninth embodiment, which is the method of any of the first through the eighth embodiments, wherein the water is present in the WSF in an amount of from about 10 gallons per barrel (gal/bbl) to about 50 gal/bbl based on the total volume of the WSF, alternatively from about 15 gal/bbl to about 45 gal/bbl, alternatively from about 20 gal/bbl to about 40 gal/bbl.

A tenth embodiment, which is the method of any of the first through the ninth embodiments, wherein the WSF further comprises clay.

An eleventh embodiment, which is the method of the tenth embodiment, wherein the clay comprises bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof.

A twelfth embodiment, which is the method of any of the first through the ninth embodiments, wherein the WSF further comprises sepiolite.

A thirteenth embodiment, which is the method of any of the tenth through the twelfth embodiments, wherein the clay is present in the WSF in an amount of from about 0.5 lb/bbl to about 8 lb/bbl based on the total volume of the WSF, alternatively from about 1 lb/bbl to about 7 lb/bbl, alternatively from about 1.5 lb/bbl to about 6 lb/bbl.

A fourteenth embodiment, which is the method of any of the first through the thirteenth embodiments, wherein the WSF further comprises a dispersant.

A fifteenth embodiment, which is the method of the fourteenth embodiment, wherein the dispersant comprises sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, and combinations thereof.

A sixteenth embodiment, which is the method of any of the fourteenth through the fifteenth embodiments, wherein the dispersant is present in the WSF in an amount of from about 0.5 lb/bbl to about 8 lb/bbl based on the total volume of the WSF, alternatively from about 1 lb/bbl to about 7 lb/bbl, alternatively from about 1.5 lb/bbl to about 6 lb/bbl.

A seventeenth embodiment, which is the method of any of the first through the sixteenth embodiments, wherein the WSF further comprises a weighting agent.

An eighteenth embodiment, which is the method of the seventeenth embodiment, wherein the weighting agent comprises barium sulfate (e.g., barite), iron oxide (e.g., hematite), manganese oxide (e.g., hausmannite), sand (e.g., silica sand), ilmenite, manganese tetraoxide, zinc oxide, zirconium oxide, fly ash, calcium carbonate, siderite, or combinations thereof.

A nineteenth embodiment, which is the method of any of the seventeenth through the eighteenth embodiments, wherein the weighting agent is present in the WSF in an amount of from about 0 lb/bbl to about 800 lb/bbl based on the total volume of the WSF, alternatively from about 0 lb/bbl to about 750 lb/bbl, alternatively from about 0 lb/bbl to about 700 lb/bbl.

A twentieth embodiment, which is the method of any of the first through the nineteenth embodiments, wherein the WSF further comprises a lost circulation material (LCM).

A twenty-first embodiment, which is the method of the twentieth embodiment, wherein the LCM comprises graphite, sand (e.g., 100 mesh), silica flour, mineral particles, thermoset polymer laminate particles, graphitic carbon-based particles, ground battery casings, ground tires, ground nut shells (e.g., walnut shells, peanut shells, and almond shells), sized-calcium carbonate particles, petroleum coke particles, vitrified shale particles, calcium clay particles, glass particles, mica particles, ceramic particles, polymeric beads, synthetic fibers (e.g., polypropylene fibers), glass fibers, mineral fibers (e.g., basalt, wollastonite, and sepiolite), and combinations thereof.

A twenty-second embodiment, which is the method of any of the twentieth through the twenty-first embodiments, wherein the LCM is present in the WSF in an amount of from about 1 lb/bbl to about 80 lb/bbl based on the total volume of the WSF, alternatively from about 2 lb/bbl to about 70 lb/bbl, alternatively from about 3 lb/bbl to about 50 lb/bbl.

A twenty-third embodiment, which is the method of any of the first through the twenty-second embodiments, wherein the WSF further comprises one or more additives.

A twenty-fourth embodiment, which is the method of the twenty-third embodiment, wherein the one or more additives comprise an emulsifier, a defoamer, an expansion agent, a salt, a fluid loss agent, a vitrified shale, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, or combinations thereof.

A twenty-fifth embodiment, which is the method of any of the twenty-third through the twenty-fourth embodiments, wherein the one or more additives are present in the WSF in an amount of from about 0.01 gal/bbl to about 5 gal/bbl based on the total volume of the WSF, alternatively from about 0.1 gal/bbl to about 4 gal/bbl, alternatively from about 0.1 gal/bbl to about 3 gal/bbl.

A twenty-sixth embodiment, which is the method of any of the first through the twenty-fifth embodiments, wherein the WSF can be used at temperature in a range of from room temperature to about 450° F.

A twenty-seventh embodiment, which is the method of any of the first through the twenty-sixth embodiments, wherein at 80° F. to 375° F. and 3000 psi the WSF has a plastic viscosity of from about 300 cP to about 20 cP.

A twenty-eighth embodiment, which is the method of any of the first through the twenty-seventh embodiments, wherein at 80° F. to 375° F. and 3000 psi the WSF has a yield point of from about 30 lbf/100 ft$^2$ to about 5 lbf/100 ft$^2$.

A twenty-ninth embodiment, which is the method of any of the first through the twenty-eighth embodiments, wherein the WSF has a density of from about 8.5 lb/gal to about 20 lb/gal.

A thirtieth embodiment, which is the method of any of the first through the twenty-ninth embodiments, wherein the WSF has a decrease or an increase in rheology reading during a compatibility test with a cement slurry at 30 rpm and 300 rpm when measured in accordance with test standard API-RP-10B-2, wherein the increasing is of equal to or less than about 30%, alternatively of equal to or greater than 10% and equal to or less than about 30%, alternatively of equal to or greater than 20% and equal to or less than about 30%.

A thirty-first embodiment, which is the method of any of the first through the thirtieth embodiments, wherein the WSF has a decrease or an increase in rheology reading during a compatibility test with a mud at 30 rpm and 300 rpm when measured in accordance with test standard API-RP-10B-2, wherein the increasing is of equal to or less than about 30%, alternatively of equal to or greater than 10% and equal to or less than about 30%, alternatively of equal to or greater than 20% and equal to or less than about 30%.

A thirty-second embodiment, which is the method of any of the first through the thirty-first embodiments, wherein the WSF has an actual fluid loss of from about 50 ml per 30 minutes to about 100 ml per 30 minutes on 60 mesh screen at 325° F., 25.3 lb/gal loading, when measured in accordance with test standard API-RP-10B-2.

A thirty-third embodiment, which is the method of any of the first through the thirty-second embodiments, wherein the WSF has an actual fluid loss of from about 50 ml per 30 minutes to about 100 ml per 30 minutes on 60 mesh screen at 375° F., 31.6 lb/gal loading, when measured in accordance with test standard API-RP-10B-2.

A thirty-fourth embodiment, which is a method of preparing a WSF, comprising placing a mixture comprising a first polymer, a second polymer, and water into a container, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one, and blending the mixture until the mixture becomes a homogeneous fluid.

A thirty-fifth embodiment, which is the method of any of the first through the thirty-third embodiments, wherein there is a conduit inside the wellbore and wherein the method further comprises: circulating the WSF down through the conduit and back up through an annular space between an outside wall of the conduit and a wall of the wellbore, or circulating the WSF down through an annular space between an outside wall of the conduit and a wall of the wellbore and back up through the conduit.

A thirty-sixth embodiment, which is a method of servicing a wellbore with casing disposed therein to form an annular space between the wellbore wall and an outer surface of the casing, wherein a first fluid is present in at least a portion of the annular space, comprising placing a spacer fluid into at least a portion of the annular space and displacing at least a portion of the first fluid from the annular space, wherein the spacer fluid comprises a first polymer, a second polymer and water, and wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one, and placing a cementitious fluid into at least a portion of the annular space and displacing at least a portion of the spacer fluid from the annular space.

A thirty-seventh embodiment, which is the method of the thirty-sixth embodiment, wherein the first fluid is a drilling fluid.

A thirty-eighth embodiment, which is the method of any of the thirty-sixth through the thirty-seventh embodiments further comprising allowing at least a portion of the cementitious fluid to set.

A thirty-ninth embodiment, which is a method of servicing a wellbore penetrating a subterranean formation, wherein the wellbore has a conduit disposed therein forming an annular space between an outer wall of the conduit and an inner wall of the wellbore, comprising pumping a first fluid followed by a spacer fluid followed by a second fluid from the surface down an inner flow bore of the conduit, out an end of the conduit, and back up the annular space toward the surface, wherein the spacer fluid comprises a first polymer, a second polymer and water, and wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

A fortieth embodiment, which is a method of servicing a wellbore penetrating a subterranean formation, wherein the wellbore has a conduit disposed therein forming an inner flow bore of the conduit and an annular space between an outer wall of the conduit and an inner wall of the wellbore, comprising pumping a first fluid followed by a spacer fluid followed by a second fluid from the surface down through the annular space, out an end of the annular space, and back up the inner flow bore toward the surface, wherein the spacer fluid comprises a first polymer, a second polymer and water, and wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

A forty-first embodiment, which is the method of the thirty-ninth or the fortieth embodiment, wherein the conduit comprises casing, the first fluid is a drilling fluid, and the second fluid is a cementitious fluid.

A forty-second embodiment, which is the method of any of the twentieth through the twenty-second embodiments, wherein the wellbore comprises a permeable zone, wherein the WSF and the LCM contact the permeable zone and reduce an inflow of fluid from the formation into the wellbore or reduce an outflow of fluid from the wellbore into the formation.

A forty-third embodiment, which is a method of treating a subterranean formation penetrated by a wellbore, comprising drilling the wellbore with a drill bit connected to drill pipe, determining a location of a lost circulation zone in an uncased portion of the wellbore, discontinuing drilling, introducing, via the drill pipe, a lost circulation fluid at proximate the location of the lost circulation zone, wherein the lost circulation fluid comprises a first polymer, a second polymer, a lost circulation material, and water, wherein the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed by polymerizing monomers and/or crosslinkers comprising 2-acrylamido-2-methylpropane sulfonic acid (AMPS), vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one, allowing the lost circulation fluid to flow into at least a portion of the lost circulation zone, allowing the lost circulation fluid to block at least a portion of the lost circulation zone, and resuming drilling of the wellbore.

A forty-fourth embodiment, which is a method of servicing a wellbore penetrating a subterranean formation, comprising: placing a WSF into the wellbore, wherein the WSF comprises a first polymer, a second polymer, and water, wherein the first polymer is formed from three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer is formed from AMPS, vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

A forty-fifth embodiment, which is a method of servicing a wellbore penetrating a subterranean formation, comprising: placing a WSF into the wellbore, wherein the WSF comprises a first polymer, a second polymer, and water, wherein the first polymer comprises a terpolymer, comprising 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline, and the second polymer comprises AMPS, vinylpyrrolidinone, pentaerythritol allyl ether, and methylenebisacrylamide, wherein in the vinylpyrrolidinone, the 2-Pyrrolidone group can be substituted by a heterocyclic group, comprising one or more Z membered rings with Y heteroatoms, wherein Z is equal to or greater than three, and wherein Y is equal to or greater than one.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, wherein the wellbore has a conduit disposed therein forming an annular space between an outer wall of the conduit and an inner wall of the wellbore, comprising:

pumping a first fluid followed by a spacer fluid followed by a second fluid from the surface down an inner flow bore of the conduit, out an end of the conduit, and back up the annular space toward the surface, wherein the spacer fluid comprises a first polymer, a second polymer and water, wherein the conduit comprises casing, the first fluid is a drilling fluid, and the second fluid is a cementitious fluid and wherein:

the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers comprising 2-acrylamido-2-methylpropane sulfonic acid (AMPS), vinylpyrrolidinone, and crosslinkers comprising pentaerythritol allyl ether and methylenebisacrylamide, wherein at least one of the following conditions (i) or (ii) is satisfied:
(i) at 80° F. to 375° F. and 3000 psi the spacer fluid has a plastic viscosity of from about 300 cP to about 20 cP, or
(ii) at 80° F. to 375° F. and 3000 psi the spacer fluid has a yield point of from about 30 lbf/100 ft$^2$ to about 5 lbf/100 ft$^2$.

2. The method of claim 1, wherein the spacer fluid further comprises clay.

3. The method of claim 2, wherein the clay comprises bentonite, sodium bentonite, montmorillonite, beidellite, nontronite, hectorite, samonite, smectite, kaolinite, serpentine, illite, chlorite, montmorillonite, saponite, sepiolite, fuller's earth, attapulgite, or combinations thereof.

4. The method of claim 1, wherein the spacer fluid further comprises sepiolite.

5. The method of claim 1, wherein the spacer fluid further comprises a dispersant.

6. The method of claim 5, wherein the dispersant comprises sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, and combinations thereof.

7. The method of claim 1, wherein the spacer further comprises a weighting agent.

8. The method of claim 1, wherein the spacer fluid further comprises a lost circulation material (LCM).

9. The method of claim 1, wherein the spacer fluid is used at temperature in a range of from room temperature to about 450° F.

10. The method of claim 1, wherein the spacer fluid has a decrease or an increase in rheology reading during a compatibility test with a cement slurry at 30 rpm and 300 rpm when measured in accordance with test standard API-RP-10B-2 (2013), wherein the increasing is of equal to or less than about 30%.

11. The method of claim 1, wherein the spacer fluid has a decrease or an increase in rheology reading during a compatibility test with a mud at 30 rpm and 300 rpm when measured in accordance with test standard API-RP-10B-2 (2013), wherein the increasing is of equal to or less than about 30%.

12. The method of claim 1, wherein the spacer fluid has an actual fluid loss of from about 50 ml per 30 minutes to about 100 ml per 30 minutes on 60 mesh screen at 325° F., 25.3 lb/gal loading, when measured in accordance with test standard API-RP-10B-2 (2013).

13. The method of claim 1, wherein the spacer fluid has an actual fluid loss of from about 50 ml per 30 minutes to about 100 ml per 30 minutes on 60 mesh screen at 375° F., 31.6 lb/gal loading, when measured in accordance with test standard API-RP-10B-2 (2013).

14. The method of claim 1, wherein the first polymer comprises an AMPS-NNDMA-acrylamide terpolymer, wherein AMPS is 2-Acrylamido-2-methyl propane sulfonic acid and NNDMA is N,N-dimethylacrylamide.

15. A method of servicing a wellbore penetrating a subterranean formation, wherein the wellbore has a conduit disposed therein forming an inner flow bore of the conduit and an annular space between an outer wall of the conduit and an inner wall of the wellbore, comprising:

pumping a first fluid followed by a spacer fluid followed by a second fluid from the surface down through the annular space, out an end of the annular space, and back up the inner flow bore toward the surface, wherein the spacer fluid comprises a first polymer, a second polymer and water, wherein the conduit comprises casing, the first fluid is a drilling fluid, and the second fluid is a cementitious fluid and wherein:

the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers comprising 2-acrylamido-2-methylpropane sulfonic acid (AMPS), vinylpyrrolidinone, and crosslinkers comprising pentaerythritol allyl ether and methylenebisacrylamide, wherein at least one of the following conditions (i) or (ii) is satisfied:
(i) the spacer fluid has an actual fluid loss of from about 50 ml per 30 minutes to about 100 ml per 30 minutes on 60 mesh screen at 325° F., 25.3 lb/gal loading, when measured in accordance with test standard API-RP-10B-2 (2013), or
(ii) the spacer fluid has an actual fluid loss of from about 50 ml per 30 minutes to about 100 ml per 30 minutes on 60 mesh screen at 375° F., 31.6 lb/gal loading, when measured in accordance with test standard API-RP-10B-2 (2013).

16. The method of claim 15, wherein at 80° F. to 375° F. and 3000 psi the spacer fluid has a plastic viscosity of from about 300 cP to about 20 cP.

17. The method of claim 15, wherein at 80° F. to 375° F. and 3000 psi the spacer fluid has a yield point of from about 30 lbf/100 ft$^2$ to about 5 lbf/100 ft$^2$.

18. The method of claim 15, wherein the first polymer comprises an AMPS-NNDMA-acrylamide terpolymer, wherein AMPS is 2-Acrylamido-2-methyl propane sulfonic acid and NNDMA is N,N-dimethylacrylamide.

19. A method of servicing a wellbore penetrating a subterranean formation, wherein the wellbore has a conduit disposed therein forming an annular space between an outer wall of the conduit and an inner wall of the wellbore, comprising:

pumping a first fluid followed by a spacer fluid followed by a second fluid from the surface down an inner flow bore of the conduit, out an end of the conduit, and back up the annular space toward the surface, wherein the spacer fluid comprises a first polymer, a second polymer and water, wherein the conduit comprises casing, the first fluid is a drilling fluid, and the second fluid is a cementitious fluid and wherein:

the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers comprising 2-acrylamido-2-methylpropane sulfonic acid (AMPS), vinylpyrrolidinone, and crosslinkers comprising pentaerythritol allyl ether and methylenebisacrylamide, wherein the first polymer comprises an AMPS-NNDMA-acrylamide terpolymer, and wherein AMPS is 2-Acrylamido-2-methyl propane sulfonic acid and NNDMA is N,N-dimethylacrylamide.

20. A method of servicing a wellbore penetrating a subterranean formation, wherein the wellbore has a conduit disposed therein forming an annular space between an outer wall of the conduit and an inner wall of the wellbore, comprising:

pumping a first fluid followed by a spacer fluid followed by a second fluid from the surface down an inner flow bore of the conduit, out an end of the conduit, and back up the annular space toward the surface, wherein the spacer fluid comprises a first polymer, a second polymer and water, wherein the conduit comprises casing, the first fluid is a drilling fluid, and the second fluid is a cementitious fluid and wherein:

the first polymer is formed by polymerizing monomers comprising three of 2-Acrylamido-2-methyl propane sulfonic acid (AMPS), N,N-dimethylacrylamide (NNDMA), acrylamide, N-vinylacetamide, allyloxy-2-hydroxy propane sulfonic acid (AHPS), acrylic acid (AA), 2-acrylamido-2-tert.-butyl sulfonic acid (ATBS), or N,N-Dimethylaniline; and the second polymer is formed by polymerizing monomers comprising 2-acrylamido-2-methylpropane sulfonic acid (AMPS), vinylpyrrolidinone, and crosslinkers comprising pentaerythritol allyl ether and methylenebisacrylamide, wherein at least one of the following conditions (i) or (ii) is satisfied:

(i) the spacer fluid has an actual fluid loss of from about 50 ml per 30 minutes to about 100 ml per 30 minutes on 60 mesh screen at 325° F., 25.3 lb/gal loading, when measured in accordance with test standard API-RP-10B-2 (2013), or (ii) the spacer fluid has an actual fluid loss of from about 50 ml per 30 minutes to about 100 ml per 30 minutes on 60 mesh screen at 375° F., 31.6 lb/gal loading, when measured in accordance with test standard API-RP-10B-2 (2013).

21. The method of claim 20, wherein the first polymer comprises an AMPS-NNDMA-acrylamide terpolymer, wherein AMPS is 2-Acrylamido-2-methyl propane sulfonic acid and NNDMA is N,N-dimethylacrylamide.

* * * * *